United States Patent Office 3,383,371
Patented May 14, 1968

3,383,371
OLEFIN-ALKENYL CYCLOBUTENE COPOLYMERS AND PROCESS FOR THEIR PREPARATION
Giulio Natta, Giorgio Mazzanti, Alberto Valvassori, and Guido Sartori, Milan, Italy, assignors to Montecatini Edison S.p.A., Milan, Italy, a corporation of Italy
No Drawing. Continuation-in-part of application Ser. No. 261,523, Feb. 27, 1963. This application Mar. 15, 1966, Ser. No. 534,434
Claims priority, application Italy, Mar. 2, 1962, 4,189/62; Mar. 16, 1965, 5,760/65
15 Claims. (Cl. 260—79.5)

ABSTRACT OF THE DISCLOSURE

This invention provides new vulcanizable, substantially linear, elastomeric, high molecular weight copolymers of
(a) at least one monoalkenyl cyclobutene and
(b) at least one monoolefin selected from ethylene, propylene and butene-1,
and more particularly to amorphous elastomeric terpolymers which, on vulcanization with conventional sulfur-based recipes, yield vulcanizates having values for the modulus, elongation at break and permanent set, rendering the vulcanizates commercially useful as general-purpose elastomers or synthetic rubbers; and to processes for producing the new copolymers.

---

This application is a continuation-in-part of U.S. application Ser. No. 261,523, filed Feb. 27, 1963, and now abandoned.

In our parent application Ser. No. 261,523, which is incorporated into the application by reference, the preparation has been described of amorphous, vulcanizable copolymers of alkenylcycloalkenes, such as 4-vinyl-cyclohexene-1, with monoolefins. Such copolymers were obtained with the aid of catalysts acting with a mechanism of the anionic coordinated type, more particularly with the aid of catalysts obtained from vanadium compounds and from metallorganic compounds of aluminum and beryllium.

It has now been found, according to the present invention, that with the aid of the same catalysts described in the parent application, it is possible to obtain linear, amorphous, unsaturated copolymers of one or more monoolefins selected from ethylene and higher alphaolefins with one or more mono-alkenylcyclobutenes, such as 3-methyl-4-(4-pentenyl)cyclobutene, 3-(1-methylallyl) cyclobutene and 3-(5-hexenyl)cyclobutene.

These monomers may, for instance, be obtained from decatriene-2,4,9, 5-methylheptatriene 1,3,6 and decatriene 1,3,9 through photoisomerization as described, for instance, in pending applications of some of the applicants.

As above said, one or more monoolefins selected from ethylene and aliphatic alpha-olefins of general formula R—CH=CH$_2$, wherein R is an alkyl group containing from 1 to 6 carbon atoms, are copolymerized together with said alkenylcyclobutenes. The monoolefins are preferably selected from ethylene, propylene and butene-1.

The copolymers obtained from said monomers consist of unsaturated macromolecules formed of monomeric units derived from each of the monomers employed. For instance, by copolymerizing a mixture of ethylene, propylene and/or butene-1 and 3-methyl-4-(4-pentenyl)cyclobutene, a raw copolymerization product is obtained which consists of macromolecules in each of which randomly distributed monomeric units of ethylene, propylene and/or butene-1, and of said alkenyl-cyclobutene are present.

Each monomeric unit derived from the polymerization of the alkenyl-cyclobutene contains a free unsaturation. Such unsaturation constitutes a reactive site for subsequent reactions which may be carried out on the copolymer. Such unsaturation allows, for instance, to vulcanize the copolymer by means of sulphur containing mixes of the type of those commonly used to vulcanize unsaturated rubbers, such as those rubbers having a low unsaturation content.

The double bonds present in the macromolecules may also give rise to polar groups, such as carbonyl groups, for example, by oxidation by means of ozone. The carbonyl groups may constitute reactive sites for subsequent reactions, such as vulcanization by means of polyvalent basic substances and may be utilized for improving the adhesiveness of the copolymer.

The double bonds may also be used in addition reactions with metal hydrides, such as LiH, NaBH$_4$, AlH(C$_4$H$_9$)$_2$ etc. The metal-to-carbon bonds thus formed may be used in subsequent reactions.

The copolymers of the present invention have a substantially linear structure, as is proved by the fact that they have properties such as a viscous behaviour, which are practicaly identical to those of known linear copolymers, such as linear ethylene-alpha-olefin copolymers.

The molecular weight of these copolymers, viscosimetrically determined, is higher than 20,000, corresponding to an intrinsic viscosity, determined in tetrahydronaphthalene at 135° C., or in toluene at 30° C., higher than 0.5. The intrinsic viscosity of the copolymers may vary between 0.5 and 10, although even higher values can be reached. For most practical purposes copolymers having an intrinsic viscosity between 1 and 5 are preferred.

The composition of the copolymers may be defined as practically homogeneous. The various monomeric units are randomly distributed. The homogeneity of such copolymers is confirmed by obtaining well vulcanized products by employing the techniques commonly used for vulcanizing unsaturated rubbers having a low unsaturation content, such as butyl rubber. As a confirmation of the fact that the unsaturations are well distributed along the macromolecular chains of the copolymers of the present invention, the vulcanized products obtained therefrom are completely insoluble in organic solvents, such as aliphatic hydrocarbons, and are swollen only to a limited extent by some aromatic solvents. This is in contrast to the copolymers, themselves, which are completely soluble in boiling n-heptane.

The vulcanized rubbers obtained possess good mechanical resistance and low deformations after breaking. They show, in particular, high reversible elastic elongations and, particularly when reinforcing fillers, such as carbon black, are used in the mix, they show also high tensile strengths.

The elastomers obtained through vulcanization may be advantageously used, in view of their good mechanical properties, in the preparation of various manufactured articles, such as tubes, tires, foils, sheets, elastic threads, gaskets, and other articles well known in the art to require or benefit from such properties.

The copolymers according to the present invention may be extended or plasticized, in a per se known manner, with the aid of hydrocarbon oils. Paraffinic and naphthenic oils are preferred, although aromatic oils may also be used.

The catalyst systems employed for the preparation of the copolymers of the present invention are the same as described in the parent application, and are prepared from metallorganic compounds of beryllium or aluminum and from vanadium compounds. They must be very dispersed such as colloidally dispersed, or completely dissolved in the hydrocarbon which is employed as polymerization medium. The polymerization medium may be, for instance aliphatic, cyclo-aliphatic or aromatic hydrocarbons, or mixtures thereof.

In the preparation of the catalyst, metallorganic compounds may be used including beryllium dialkyls, beryllium alkylhalides, beryllium diaryls, aluminum trialkyls, aluminum dialkylmonohalides, aluminum monoalkyldihalides, aluminum alkylsesquihalides, aluminum alkylenes, aluminum alkenyls, aluminum cycloalkyls, aluminum cycloalkylalkyls, aluminum aryls, aluminum alkylaryls, aluminum dialkylalkoxides, aluminum alkylalkoxyhalides, and complexes of the above mentioned aluminum organic compounds with complexing agents, such as weak Lewis bases. As examples of compounds belonging to the above mentioned group one may quote the following: beryllium diethyl, beryllium methylchloride, beryllium dimethyl, beryllium di-n-propyl, beryllium di-iso-propyl, beryllium di-n-butyl, beryllium di-t-butyl, beryllium dihpenyl, aluminum triethyl, aluminum tri-iso-butyl, aluminum trihexyl, aluminum diethylmonochloride, aluminum diethylmonofluoride, aluminum di-iso-butylmonochloride, aluminum monoethyldichloride, aluminum ethylsesquichloride, aluminum butenyldiethyl, aluminum iso-hexenyl-diethyl, 2-methyl-1,4-di (di-iso-butylaluminum)-butane, aluminum tri-(cyclopentylmethyl), aluminum tri (dimethylcyclopentylmethyl), aluminum triphenyl, aluminium tritolyl, aluminum di (cyclopentylmethyl) monochloride, aluminum di-iso-butylmonochloride complexed with anisole, aluminum monochloromonoethylmonoethoxide, aluminum diethylpropoxide, aluminum diethylamyloxide, aluminum monochloromonopropylmonopropoxide, aluminum monochloromonopropylmonoethoxide.

In the preparation of the catalyst, vanadium compounds are, as above said, used together with the above mentioned metallorganic compounds. Vanadium compounds are preferably used which are soluble in the hydrocarbons used as polymerization medium, such as halides and oxyhalides, for instance $VCl_4$, $VOCl_3$, $VBr_4$ and those compounds in which at least one of the metal valences is saturated by a heteroatom, more particularly oxygen or nitrogen, bound to an organic group, such as vanadium triacetylacetonate and tribenzoylacetonate, vanadyl diacetylacetonate, and haloacetylacetonates, vanadyl trialkoxides and haloalkoxides, and tetrahydrofuranates, etherates, aminates, pyridinates and quinolinates of vanadium tri- and tetra-chloride, and of vanadyl trichloride. Hydrocarbon insoluble vanadium compounds selected from organic salts, such as vanadium triacetate, tribenzoate and tristearate may also be used.

In practice, in order to obtain the best results, it is necessary to operate in the presence of halogen containing catalyst systems, in which at least one of the catalyst components contains halogen atoms.

The copolymerization may be carried out at temperatures between —80° and 125° C. When catalysts are used which are prepared from vanadium triacetylacetonate, vanadyl diacetylacetonate or haloacetonates or, in general, from a vanadium compound such as, in addition to those already cited, $VCl_4$ or $VOCl_3$, in the presence of aluminum alkylhalides, in order to obtain high copolymer yields per weight unit of catalyst employed, it is convenient to carry out both the catalyst preparation and the copolymerization at temperatures between 0 and —80° C., preferably between —10 and —50° C. By operating under these conditions the catalysts show a higher activity in comparison with the same catalyst systems when prepared at higher temperatures. Moreover, by operating within the above mentioned low temperature of below 0° C., the catalysts maintain their activity practically unaltered with time.

When catalysts are employed which are prepared from an aluminum alkyl halide and from vanadium triacetylacetonate, vanadyl trialkoxides or halogenalkoxides, at temperatures between 0 and 125° C., in order to obtain high copolymer yields, it is convenient to operate in the presence of complexing agents, selected from the group consisting of ethers, thioethers, tertiary amines and trisubstituted phosphines containing at least a branched alkyl group or an aromatic nucleus. The complexing agent may be an ether of the formula RYR', wherein Y is oxygen or sulphur, and R and R' represent a linear or branched alkyl group containing 1 to 14 carbon atoms, or an aromatic nucleus containing 6 to 14 carbon atoms. At least one of the R and R' groups must be a branched alkyl group or an aromatic nucleus. The complexing agent may also be a tertiary amine of the formula

wherein R, R' and R'' each represent an alkyl group containing 1 to 14 carbon atoms or an aromatic nucleus containing 6 to 14 carbon atoms, at least one of R, R' and R'', being an aromatic nucleus. The complexing agent may also be a tertiary phosphine of the formula

wherein R, R' and R'' each represent an alkyl group containing 1 to 14 carbon atoms or an aromatic nucleus containing 6 to 14 carbon atoms, at least one of R, R' and R'', being an aromatic nucleus.

The amount of complexing agent is preferably between 0.05 and 1 mole per mole of aluminum alkylhalide.

The activity of the catalysts varies with the molar ratio of metallorganic compound to vanadium compound used for their preparation. It has in fact been found that by using, for instance, aluminum trialkyls and vanadium halides or oxyhalides, it is convenient to use catalysts in which the ratio between the mols of aluminum trialkyl and the mols of the vanadium compounds is between 1 and 5, preferably between 2 and 4. By employing, on the other hand, aluminum diethylmonochloride, $Al(C_2H_5)_2Cl$ and vanadium triacetylacetonate, $V(Ac)_3$, the best results are obtained with a molar ratio $$(Al(C_2H_5)_2Cl/VAc_3)$$

between 2 and 20, preferably between 4 and 10.

The copolymerization may be carried out in the presence of an aliphatic, cycloaliphatic or aromatic hydrocarbon solvent, such as butane, pentane, n-heptane, cyclohexane, benzene, toluene, xylene or mixtures thereof. Halogenated hydrocarbons such as methylene chloride, chloroform, trichloroethylene, tetrachloroethylene, chlorobenzene, etc. may also be used as solvents. Particularly high copolymerization rates may be obtained if the copolymerization is carried out in the absence of any inert solvent, by employing as solvent the monomers themselves, kept in the liquid state, that is, in the presence of a solution of ethylene, and/or alpha-olefins, and of the diene, kept in the liquid state. Working in the absence of inert solvent is, however possible only if one of the double bonds contained in the alkenylcyclobutene polymerizes under the given reaction conditions, e.g. if the double bond of the alkenyl group is internal or substituted. If both double bonds can react, crosslinking takes place.

In order to obtain copolymers having a high homogeneity of composition it is convenient to keep constant or at least as constant as possible, the ratio between the concentration of the monomers to be copolymerized, present in the reacting liquid phase. Thus, it may be convenient to carry out the copolymerization in a continuous way be continuously feeding and discharging a monomer mixture having constant composition and by operating with high space velocities.

By varying the composition of the monomer mixture one may vary within wide limits the composition of the copolymers. If amorphous terpolymers of the above said cyclobutenes with ethylene and propylene are desired, it is convenient to keep in the reaction liquid phase a molar ratio between ethylene and propylene lower than or at most equal to 1:4, which corresponds to a molar ratio of 1:1 in the gaseous phase under normal conditions. Molar ratios in the liquid phase between 1:200 and 1:4 are usually preferred. If butene-1 is used, instead of propylene, the molar ratio between ethylene and butene must be at most equal to 1:20, which corresponds to a molar ratio between ethylene and butene-1 in the gaseous phase of 1:1.5 under normal conditions. Molar ratios in the liquid phase between 1:1000 and 1:20 are usually preferred.

By operating under these conditions amorphous terpolymers are obtained which contain less than about 75% by mols of ethylene. If these values are exceeded the copolymer shows a polyethylenic type crystallinity. The lower ethylene content is not critical; it is however preferable that the copolymers contain at least 5% by mols of ethylene. The alpha-olefin content in the amorphous copolymer may preferably vary from a minimum of 5% up to a maximum content of 95% by mols. The cyclobutene unit content in the copolymers is preferably between 0.1 and 20% by mols. This upper limit may be increased, but especially for econimical reasons it is not convenient to introduce into the copolymer a cyclobutene unit content higher than 20% by mols.

If, on the other hand, binary amorphous copolymers of ethylene and of a alkenylcyclobutene are to be obtained, the content of the latter must be higher than 25% by mols.

The following examples illustrate the invention without limiting its scope.

Example 1

The reaction apparatus consists of a glass cylinder having a diameter of 5.5 cm. and a volume of 700 cm.$^3$ and provided with stirrer and gas inlet and outlet tubes. The gas inlet tube reaches the cylinder bottom and ends in a porous diaphragm (diameter 3.5 cm.). 200 cm.$^3$ of anhydrous n-heptane and 0.75 cm.$^3$ of 3-methyl-4-(4-pentenyl) cyclobutene are introduced into the apparatus which is kept at the constant temperature of —20° C. Through the gas inlet tube a gaseous propylene-ethylene mixture in the molar ratio of 4:1 is introduced and circulated at the rate of 250 N l./h. (normal litres per hour, measured at 15° C. and 1 atm.).

The catalyst is preformed in a 100 cm.$^3$ flask by operating at —20° C. under nitrogen atmosphere and by reacting 0.5 millimol of vanadyl trichloride and 2.5 millimols of aluminum ethylsesquichloride (in this and in other examples the millimols are calculated as aluminum atoms), ½ [Al$_2$(C$_2$H$_5$)$_3$Cl$_3$], in 50 cm.$^3$ of anhydrous n-heptane. The thus prepared catalyst is siphoned into the reactor by means of nitrogen pressure.

The gaseous ethylene-propylene mixture is continuously fed and discharged at the rate of 250 N l./h. 4 minutes after the introduction of the catalyst the reaction is stopped by adding 10 cm.$^3$ of methanol containing 0.1 g. of phenyl-betanaphthylamine. The product is purified in a separatory funnel by means of repeated treatments with diluted hydrochloric acid, then with water, and is then coagulated with acetone.

After vacuum drying, 3 g. of solid product are obtained, which is amorphous at the X-rays, looks like a non-vulcanized elastomer, and is completely soluble in boiling n-heptane. Infrared spectrographic examination reveals the presence of vinyl groups (band at 6.1, 10 and 11 micron). The ethylene/propylene molar ratio is about 1.

100 parts by weight of terpolymer are mixed, in a laboratory roll mixer with 50 parts of HAF black, 5 parts of zinc oxide, 1.5 parts of sulfur, 1.5 parts of tetramethylthiurammonosulphide and 0.5 part of mercaptobenzothiazole. The mix is vulcanized in a press at 150° C. during 60 minutes. A vulcanized lamina having following characteristics is obtained:

Tensile strength _____kg./cm.$^2$__ 197
Elongation at break _____percent__ 400
Modulus at 200% _____kg./cm.$^2$__ 67
Modulus at 300% _____kg./cm.$^2$__ 113
Permanent set _____percent__ 10

Example 2

The reaction apparatus is similar to the one described in Example 1, but is provided with a glass cylinder having a diameter of 7.5 cm. and a volume of 1,500 cc. 700 cm.$^3$ of anhydrous n-heptane and 2.5 cm.$^3$ of 3-methyl-4-(4-pentenyl) cyclobutene are introduced into the reactor, which is kept at the constant temperature of —20° C. Through the gas inlet tube a propylene/ethylene mixture in the molar ratio 4:1 is introduced and circulated at the rate of 500 N l./h.

The catalyst is preformed in a 100 cm.$^3$ flask by operating at —20° C. under nitrogen atmosphere and by reacting 1 millimol of vanadium tetrachloride and 5 millimols of aluminum ethylsesquichloride, ½ [Al$_2$(C$_2$H$_5$)$_3$Cl$_3$]

in 50 cm.$^3$ of anhydrous n-heptane.

The thus preformed catalyst is introduced into the reactor under nitrogen atmosphere. The ethylene-propylene gaseous mixture is continuously fed and discharged at the rate of 500 N l./h. 4 minutes after the introduction of the catalyst, the reaction is stopped by adding 10 cm.$^3$ of methanol cantaining 0.1 g. of phenyl-beta-naphthylamine. The product is purified and isolated as described in Example 1.

After vacuum drying, 9.5 g. of a solid product are obtained, which is amorphous at the X-rays, looks like a non-vulcanized elastomer, and is completely soluble in boiling n-heptane. Infrared spectrographic analysis reveals the presence of vinyl groups (bands at 6.1, 10 and 11 micron). The ethylene/propylene molar ratio is about 1.

The terpolymer is vulcanized with the same mix and the same procedure of Example 1. A vulcanized lamina having following characteristics is obtained:

Tensile strength _____kg./cm.$^2$__ 186
Elongation at break _____percent__ 330
Modulus at 200% _____kg./cm.$^2$__ 84
Modulus at 300% _____kg./cm.$^2$__ 164
Permanent set _____percent__ 6

Example 3

1050 cm.$^3$ of anhydrous n-heptane and 3.5 cm.$^3$ of 3-methyl-4-(4-pentenyl) cyclobutene are introduced into the same reaction apparatus described in Example 2, which is kept at the constant temperature of —20° C. Through the gas inlet tube a propylene/ethylene mixture in the molar ratio 4:1 is introduced and circulated at the rate of 750 N l./h.

The catalyst is preformed in a 100 cm.$^3$ flask, by operating at —20° C. under nitrogen atmosphere and by reacting 2.5 millimols of vanadium tetrachloride and 7.5 millimols of aluminum ethylsesquichloride, ½ [Al$_2$(C$_2$H$_5$)$_3$Cl$_3$]

in 50 cm.$^3$ of anhydrous n-heptane.

The thus preformed catalyst is siphoned into the reactor under nitrogen atmosphere. The ethylene/propylene mixture is continuously introduced and discharged at the rate of 750 N l./h. 10 minutes after the introduction of the catalyst the reaction is stopped by adding 10 cm.$^3$ of methanol containing 0.1 g. of phenyl-beta-naphthylamine. The product is purified and isolated as described in Example 1.

After vacuum drying, 13.7 g. of a solid product are obtained which is amorphous at the X-rays, looks like a non-vulcanized elastomer, and is completely soluble in boiling n-heptane. Infrared spectrographic examination reveals the presence of vinyl groups (band at 6.1, 10 and 11 micron). The ethylene/propylene molar ratio is about 1.

The terpolymer is vulcanized with the same mix and the same procedure of Example 1, by operating at 150° C. for different times.

The characteristics of the vulcanized products are reported in the following table:

| Time (minutes) | 60 | 90 | 120 | 240 |
|---|---|---|---|---|
| Tensile strength (kg./cm.$^2$) | 180 | 185 | 178 | 176 |
| Elongation at break (Percent) | 340 | 330 | 320 | 280 |
| Modulus at 200% (kg./cm.$^2$) | 82 | 90 | 95 | 99 |
| Modulus at 300% (kg./cm.$^2$) | 154 | 166 | 170 | |
| Permanent set (Percent) | 6 | 6 | 6 | 4 |

Example 4

1050 cm.$^3$ of anhydrous n-heptane and 1.5 cm.$^3$ of 3-(5-hexenyl)-cyclobutene are introduced into a reaction apparatus, similar to that of Example 2, kept at −20° C. A propylene-ethylene mixture in the molar ratio of 4:1 is introduced through the gas inlet tube and circulated at the rate of 750 N l./h.

The catalyst is preformed in a 100 cm.$^3$ flask by operating at −20° C. under nitrogen atmosphere and by reacting 1 millimol of vanadium tetrachloride and 5 millimols of ethylaluminumsesquichloride, ½ [Al$_2$(C$_2$H$_5$)$_3$Cl$_3$] in 30 cm.$^3$ of anhydrous n-heptane.

The thus preformed catalyst is siphoned into the reactor by means of nitrogen pressure. The ethylene-propylene mixture is continuously fed and discharged at the rate of 750 N l./h. 10 minutes after the introduction of the catalyst the reaction is stopped by adding 10 cm.$^3$ of methanol containing 0.1 g. of phenyl-beta-naphthylamine. The product is purified and isolated as described in Example 1.

After vacuum drying, 16 g. of a product are obtained which is amorphous at the X-rays, looks like a non-vulcanized elastomer, and is completely soluble in boiling n-heptane. Infrared spectrographic analysis shows the presence of vinyl bands (bands at 6.1, 10 and 11 micron). The ethylene-propylene molar ratio is about 1.

The terpolymer is vulcanized with the same mix and the same modalities of Example 1.

A vulcanized lamina having following characteristics is obtained:

| | |
|---|---|
| Tensile strength | kg./cm.$^2$ _ 178 |
| Elongation at break | percent _ 360 |
| Modulus at 200% | kg./cm.$^2$ _ 75 |
| Modulus at 300% | kg./cm.$^2$ _ 146 |
| Permanent set | percent _ 8 |

Example 5

200 cm.$^3$ of anhydrous n-heptane and 1 cm.$^3$ of 3-(1-methyl-allyl)-cyclobutene are introduced into a reaction apparatus similar to the one described in Example 1, which is kept at −20° C.

Through the gas inlet tube a gaseous propylene-ethylene mixture in the molar ratio 2:1 is introduced and circulated at the rate of 450 N l./h. The catalyst is preformed in a 100 cm.$^3$ flask by operating at −20° C. under nitrogen atmosphere and by reacting 2.8 millimols of vanadium triacetylacetonate and 14 millimoles of aluminum diethylmonochloride in 30 cm.$^3$ of anhydrous toluene.

The thus preformed catalyst is siphoned into the reactor by means of nitrogen pressure. The gaseous ethylene-propylene mixture is continuously fed and discharged at the rate of 450 N l./h.

2.5 minutes after the introduction of the catalyst the reactor is stopped by adding 10 cm.$^3$ of methanol containing 0.1 g. of phenyl-beta-naphthylamine. The product is purified and isolated as described in Example 1. After vacuum drying, 4.5 g. of solid product which is amorphous on X-ray examination, looks like a non-vulcanized elastomer, and is completely soluble in boiling n-heptane is obtained.

Infrared spectrographic examination shows the presence of vinyl groups (bands at 10 and 11μ). The ethylene-propylene molar ratio is about 1.

The copolymer is vulcanized with the same mix and the same modalities described in Example 1. A vulcanized lamina is obtained having following characteristics:

| | |
|---|---|
| Tensile strength | kg./cm.$^2$ _ 190 |
| Elongation at break | percent _ 470 |
| Modulus at 200% | kg./cm.$^2$ _ 65 |
| Modulus at 300% | kg./cm.$^2$ _ 130 |
| Permanent set | percent _ 10 |

As will be apparent, various changes in details may be made in the practice of this invention without departing from the spirit thereof. It is intended, therefore, to include in the scope of the appended claims, all such modifications in details as will be obvious to those skilled in the art from the description and working examples given herein.

What is claimed is:

1. Vulcanizable, substantially linear, elastomeric, high molecular weight copolymers of at least one mono-alkenyl-cyclobutene monomer selected from the group consisting of 3-methyl-4-(4-pentenyl)-cyclobutent, 3-(1-methylallyl)-cyclobutene, and 3-(5-hexenyl)-cyclobutene, with at least one monomer selected from the group consisting of ethylene propylene and butene-1, said copolymers substantially consisting of unsaturated macromolecules each of which macromolecules consists of copolymerized monomeric units derived from each of the monomers used.

2. Copolymers according to claim 1 in which the monomers used are ethylene, propylene and the selected alkenyl-cyclobutene.

3. Copolymers according to claim 1 in which the monomers used are ethylene, butene-1 and the selected alkenyl-cyclobutene.

4. Process for the preparation of the copolymers of claim 1, characterized in that the monomer mixture is polymerized in the liquid phase in contact with a catalyst obtained from:

(a) vanadium compounds selected from the group consisting of the hydrocarbon-soluble vanadium halides, vanadium oxyhalides and vanadium compounds in which at least one of the metal valences is saturated by a heteroatom bound to an organic group, said heteroatom being selected from the group consisting oxygen and nitrogen, and (b) metallorganic compounds of a metal selected from the group consisting of aluminum and beryllium.

5. Process according to claim 4, characterized in that the monomer mixture is polymerized in contact with a halogen containing catalyst in which at least one of the components (a) and (b) contains at least one halogen atom.

6. Process according to claim 4, characterized in that the polymerization is carried out at a temperature between −80 and +125° C.

7. Process according to claim 4, characterized in that catalysts are employed which are obtained from a vanadium compound and an aluminum alkylhalide, and in which both the catalyst preparation and the polymerization are carried out at a temperature between 0 and −80° C.

8. Process according to claim 4, characterized in that catalysts are employed which are obtained from aluminum trialkyls and from vanadium compounds selected from the group consisting of halides and oxyhalides, the ratio between the mols of aluminum trialkyl and the mols of the vanadium compound being between 1 and 5.

9. Process according to claim 4, characterized in that a catalyst is employed which is obtained from aluminum diethylmonochloride and vanadium triacetylacetonate, the ratio between the mols of aluminum diethylmonochloride and the mols of vanadium triacetylacetonate being between 2 and 20.

10. Process according to claim 4, characterized in that the polymerization is carried out in the presence of the monomers in the liquid state, in the absence of inert solvents.

11. Process for the preparation of an amorphous copolymer of an alkenyl cyclobutene selected from the group consisting of 3-methyl-4-(4-pentenyl) cyclobutene and 3-(5-hexenyl) cyclobutene with ethylene and propylene, according to claim 4, characterized in that the molar ratio between ethylene and propylene in the reacting liquid phase is at most 1:4.

12. Process according to claim 11 in which the ethylene to propylene is from 1:4 to 1:200.

13. Process for the preparation of an amorphous copolymer of an alkenyl-cyclobutene selected from the group consisting of 3-methyl-4-(4-pentyl)cyclobutene and 3-(5-hexenyl) cyclobutene with ethylene and butene-1 according to claim 5, characterized in that the molar ratio between ethylene and butene-1 in the reacting liquid phase is at most 1:20.

14. Process according to claim 13 in which the ethylene to butene-1 ratio is from 1:20 to 1:1000.

15. The copolymers according to claim 1, sulfur-vulcanized to an elastomeric material.

References Cited

UNITED STATES PATENTS

| | | | |
|---|---|---|---|
| 2,933,480 | 4/1960 | Gresham et al. | 260—80.5 |
| 3,211,709 | 10/1965 | Adamek et al. | 260—80.5 |
| 3,222,331 | 12/1965 | Duck et al. | 260—80.5 |
| 3,222,333 | 12/1965 | Duck et al. | 260—80.5 |

JAMES A. SEIDLECK, *Primary Examiner.*

JOSEPH L. SCHOFER, *Examiner.*

W. HOOVER, *Assistant Examiner.*

UNITED STATES PATENT OFFICE
CERTIFICATE OF CORRECTION

Patent No. 3,383,371                                May 14, 1968

Giulio Natta et al.

It is certified that error appears in the above identified patent and that said Letters Patent are hereby corrected as shown below:

Column 9, line 12, "3-methyl-4-(4-pentyl)-cyclobutene" should read -- 3-methyl-4-(4-pentenyl)-cyclobutene --.

Signed and sealed this 11th day of November 1969.

(SEAL)
Attest:

Edward M. Fletcher, Jr.
Attesting Officer

WILLIAM E. SCHUYLER, JR.
Commissioner of Patents